United States Patent
Soukup et al.

(10) Patent No.: US 7,883,410 B2
(45) Date of Patent: Feb. 8, 2011

(54) SYSTEM AND METHOD FOR ESTABLISHING A PROGRESSIVE JACKPOT AWARD

(75) Inventors: Thomas E Soukup, Las Vegas, NV (US); Jeffrey George, Las Vegas, NV (US); Steve Sutherland, Henderson, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 1340 days.

(21) Appl. No.: 11/066,753

(22) Filed: Feb. 25, 2005

(65) Prior Publication Data

US 2006/0052162 A1 Mar. 9, 2006

Related U.S. Application Data

(60) Provisional application No. 60/608,519, filed on Sep. 9, 2004.

(51) Int. Cl.
  *A63F 11/00* (2006.01)
(52) U.S. Cl. .............. 463/27; 463/25; 463/26; 705/14.11; 705/14.12
(58) Field of Classification Search ............... 463/1–42; 705/14
   See application file for complete search history.

(56) References Cited

U.S. PATENT DOCUMENTS

| | | | |
|---|---|---|---|
| 6,110,043 A * | 8/2000 | Olsen | ............ 463/27 |
| 6,319,125 B1 | 11/2001 | Acres | |
| 6,371,852 B1 * | 4/2002 | Acres | ............ 463/25 |
| 6,511,377 B1 * | 1/2003 | Weiss | ............ 463/25 |
| 6,626,758 B1 | 9/2003 | Parham et al. | |
| 6,776,715 B2 | 8/2004 | Price | |
| 2002/0039923 A1 | 4/2002 | Cannon et al. | |
| 2002/0177483 A1 * | 11/2002 | Cannon | ............ 463/42 |
| 2003/0032474 A1 * | 2/2003 | Kaminkow | ............ 463/25 |
| 2003/0083943 A1 * | 5/2003 | Adams et al. | ............ 705/14 |
| 2003/0146574 A1 * | 8/2003 | Duhamel | ............ 273/292 |
| 2004/0209674 A1 | 10/2004 | Conover et al. | |
| 2005/0054439 A1 * | 3/2005 | Rowe et al. | ............ 463/29 |

* cited by examiner

*Primary Examiner*—Ronald Laneau
*Assistant Examiner*—Justin Myhr
(74) *Attorney, Agent, or Firm*—Howard & Howard Attorneys PLLC

(57) ABSTRACT

System and method establish a progressive jackpot award associated with a machine useable by a user. The user has a user account stored in a computer connected to the machine. The computer includes a database for storing user account data including bonus points associated with the user. The progressive jackpot award has an associated payout value. The user uses the bonus points on the machine and an incremental number is added to the payout value of the progressive jackpot award as a function of the number of bonus points used by the user.

31 Claims, 3 Drawing Sheets

SYSTEM AND METHOD FOR ESTABLISHING A PROGRESSIVE JACKPOT AWARD

CROSS-REFERENCE TO RELATED APPLICATIONS

The present application claims priority to U.S. Provisional Application Ser. No. 60/608,519, filed Sep. 9, 2004, which is incorporated herein by reference.

FIELD OF THE INVENTION

The present invention relates generally to gaming machines, and more particularly, to a system and method for providing a progressive jackpot award.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

One area that has received a lot of attention in recent years has been providing added incentives to players of electronic gaming machines, such as video slot machines video poker machines.

One type of award may be selected at random or be based on a player's previous level of play. Once a player has met the selected criteria, the award in credits paid from the machine's hopper is released.

Players may also be given an incentive through a player tracking club. Usually, a player is identified during play by a player tracking ID card and/or a player identification number (PIN). The player tracking system tracks the player's play and awards player tracking points according to established criteria. The player tracking points may be redeemed for prizes, such as complimentary meals or merchandise.

Another type of incentive is given through a progressive jackpot award. A progressive jackpot award is a constantly accumulating award based on coin or credit-in, i.e., the tokens played by players, on a plurality of predetermined gaming machines, such as slot or video slot machines. The progressive jackpot award has a minimum value and increases until some maximum value. The progressive jackpot award is awarded to the player under some predetermined conditions.

However, these systems are inflexible and do not provide the casino operator with the maximum benefit and advantages available from the information and systems now available.

The present invention is aimed at one or more of the problems as set forth above.

SUMMARY OF THE INVENTION AND ADVANTAGES

In a first aspect of the present invention, a method for establishing a progressive jackpot award associated with a machine useable by a user is provided. The user has a user account stored in a computer connected to the machine. The computer includes a database for storing user account data including bonus points associated with the user. The progressive jackpot award has an associated payout value. The method includes the steps of allowing the user to access the bonus points in the user account from the machine, allowing the user to use a number of the bonus points on the machine, and adding an incremental number to the associated payout value of the progressive jackpot award as a function of the number of bonus points used by the user.

In a second aspect of the present invention, a method for providing a progressive jackpot award to a user of one of a plurality of machines connected to a computer is provided. The user has a user account stored in the computer. The user account has a number of bonus points associated with the user. The progressive jackpot award has an associated payout value. The method includes the steps of allowing the user to access the bonus points in the user account from one of the plurality of machines, allowing the user to use a number of bonus points on the machine, and adding an incremental number to the associated payout value of the progressive jackpot award as a function of the number of bonus points used by the user. The method also includes the steps of determining if a trigger event has occurred and paying out the progressive jackpot award to the user if the trigger event has occurred as a result of the user using the bonus points.

In a third aspect of the present invention, a system for establishing a progressive jackpot award is provided. The progressive jackpot award has an associated payout value. The system includes a machines useable by a user and a computer coupled to the machine for tracking a user account. A database, on the computer, stores user account data in the user account, including bonus points associated with the user. The computer allows the user to access the bonus points in the user account from the machine, to use a number of bonus points on the machine, and adds an incremental number to the progressive jackpot award as a function of the number of bonus points used by the user.

In a fourth aspect of the present invention, a system for providing a progressive jackpot award is provided. The progressive jackpot award has an associated number of credits. The system includes a plurality of machines useable by a user and a computer coupled to the plurality of machines for tracking a user account. A database, on the computer, stores user account data in the user account including bonus points associated with the user. The computer allows the user to access the bonus points in the user account from one of the plurality of machines and to use a number of bonus points on the one of the plurality of machines and adds an incremental number to the progressive jackpot award as a function of the number of bonus points used by the user. The computer further determines if a trigger event has occurred and responsively pays out the progressive jackpot award to the user if the trigger event has occurred as a result of the user using the bonus points.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

With reference to the drawings and in operation, the present invention provides a system 10 and method for establishing and/or awarding a progressive jackpot award to a user 24 of a machine 12.

Figure 1:
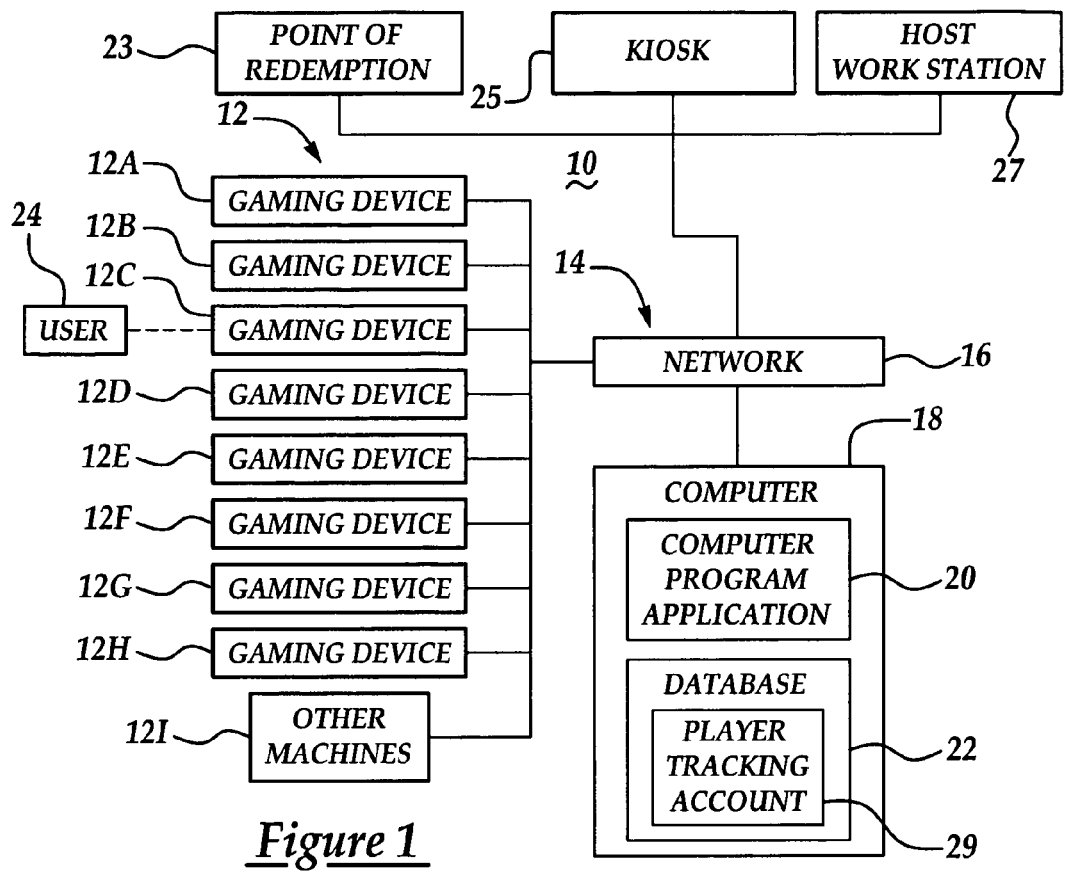
FIG. 1 is block diagram of a system for providing credit to a player of a gaming machine, according to an embodiment of the present invention.

In one embodiment, the system 10 and method 50, 60, 70 may be embodied or implemented via an entertaining management and monitoring system 14 which is shown in block diagram form in FIG. 1. The entertainment and monitoring system 14 may include may additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT). Two such systems are disclosed in U.S. patent application Ser. No. 09/967,571, filed Sep. 28, 2001, and U.S. Provisional Application Ser. No. 60/502,179, filed Sep. 11, 2003, both of which are hereby incorporated by reference.

As shown, the system 10 includes a plurality of gaming machines 12. Machines 12 may include, but are not limited to gaming machines, electronic gaming machines (such as video slot, video poker machines, or video arcade games), electric gaming machines, virtual gaming machines, e.g., for online gaming, an interface to a table management system (not shown) for table games, kiosks 25, point of sale or redemption terminals 23, or other suitable devices at which a user 24 may interact or access a user 24 or player account. In the illustrated embodiment, eight electronic machines (EGM) 12A-12H are shown. However, it should be noted that the present invention is not limited to any number or type of machines 12. In one embodiment, the machines 12 are organized into banks (not shown), each bank containing a plurality of machines 12.

Other types of gaming machines which may be included (see above) are indicated with reference number 121.

The gaming machines 12 are connected via a network 16 to one or more host computers 18, which are generally located at a remote or central location. The computer 18 includes a computer program application 20 which maintains one or more databases 22. In one embodiment, the database(s) are Oracle database(s).

The computer program application 20 and databases 22 may be used to record, track, and report accounting information regarding the gaming machines 12 and players of the gaming machines 12. Additionally, the computer program application 20 and databases 22 may be used to maintain information related to player or player-tracking accounts 29 (see below).

In general, the machines 12 may be used by a user 24 or player, i.e., to access their player account. For example, a gaming machine 12C is playable by a player 24. The player 24 may select one of the gaming machines 12C to play and insert a coin, credit, coupon, and/or player tracking card (not shown) into the chosen EGM 12C. Generally, the gaming machines 12C have an associated number of credits or coins required in order to play. In the case of video slot or poker games, the game is played and an award in the form of credits may be awarded based on a pay table of the gaming machine 12.

Figure 2:
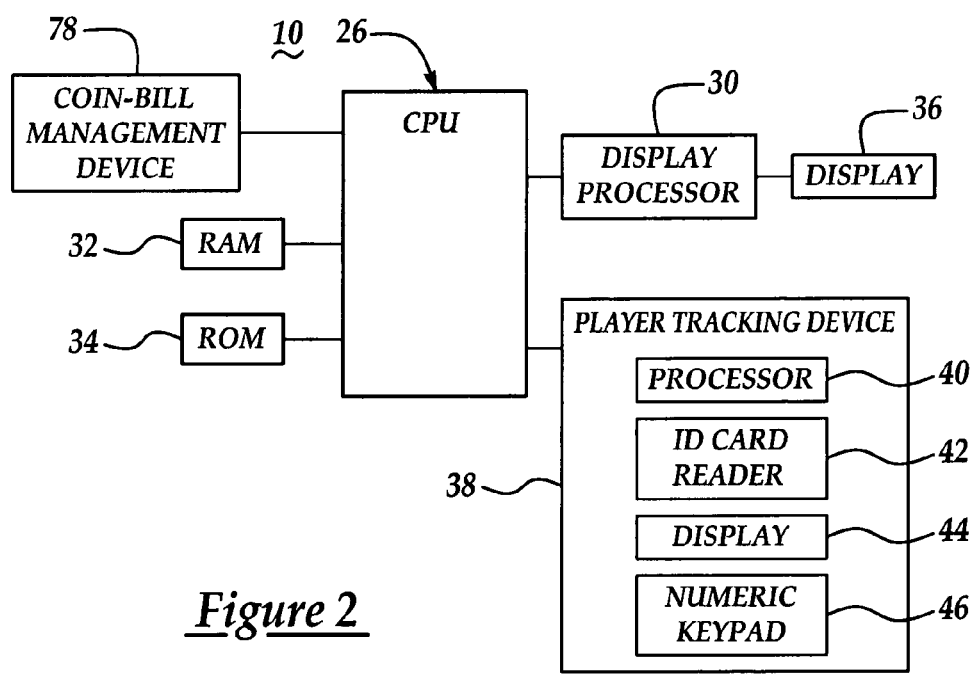
FIG. 2 is a block diagram of a gaming machine for use with the system of FIG. 1.

With reference to FIG. 2, a block diagram of a suitable electronic gaming machine 12C is shown.

The machine 12C comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the machine 12C, such as the booting operation thereof, game code and graphics.

Input to the gaming device 12C may be accomplished via mechanical switches or buttons or via a touchscreen interface (not shown). Such gaming machines 12 are well known in the art and are therefore not further discussed.

The player 24 is identified via the player tracking card and/or a player identification number entered into player tracking device 38 at each EGM 12 (see below). Player tracking accounts may be used, generally, to provide bonuses to a player, in addition to the award designated by, in the case of a video slot or poker machine, the EGM's 12 paytable. These bonuses may be awarded to the player 24 based a set of criteria, including, but not limited to, a) the player's play on the machine 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location.

In one embodiment, the player-tracking device 38 includes a processor 40, a player identification card reader 42 and/or a numeric keypad 46, and a display 44. In one embodiment, the display 44 is a touch-screen panel and the numeric keypad 46 is implemented thereon.

The player 24 may be identified by entry of a player tracking card into the player identification card reader 42 and/or entry of a player identification number (PIN) on the numeric key pad 46. The play tracking device 38 may also be used to communicate information between the computer 18 and the corresponding EGM 12C. The player tracking device 40 may also be used to track bonus points, i.e., incentive points or credits, downloaded from the computer 18.

In one aspect of the present invention, the bonuses are awarded as bonus points. In one embodiment, the bonus points are incentive points. Incentive points may be traded or used in exchange for gifts and/or services, such as hats, t-shirts, meals, etc . . . . In another embodiment, the bonus points may be converted to credits. In another aspect, the a bonus may be a voucher for a specific gifts and/or service. The voucher may have a corresponding number of bonus points.

The incentive points may converted to credits using a predetermined ratio. The predetermined ratio may be 1 or any other desired ratio. The predetermined ratio may also be varied based on determined criteria, e.g., the gaming machine 12 being played, the player, or the time of day. Incentive points may be designated as cashable or non-cashable. As described below, the incentive points in a player account may be downloaded to one of the gaming machines 12 for play.

Bonus points stored in the player account, which may be convertible to credits, may be designated as cashable or non-cashable. In one embodiment, the player account may include only cashable incentive points. In another embodiment, the player account may include only non-cashable incentive points. In a third embodiment, the player account may include both cashable and non-cashable incentive points.

In still another embodiment, the player account may include incentive points, cashable and/or non-cashable, and credits, cashable and/or non-cashable.

Cashable credits, or incentive points converted into credits, may be downloaded to an EGM 12. When the player has finished playing the EGM 12, any remaining credits may be cashed out, i.e., retrieved as coins or placed on a printed ticket or player tracking card for redemption or play on another gaming machine 12.

Non-cashable credits must be played. When the player stops playing an EGM 12C, any remaining non-cashable credits which were downloaded to the EGM 12C are either lost or uploaded back to the player account (see below).

Systems and methods for awarding, downloading, and using incentive awards are disclosed in U.S. patent application Ser. No. 10/661,198, entitled "SYSTEM AND METHOD FOR CREDITING A PLAYER OF A GAMING MACHINE", filed on Sep. 12, 2003, U.S. patent application Ser. No. 10/938,677, entitled "A SYSTEM AND METHOD FOR AWARDING INCENTIVE AWARDS TO A PLAYER OF A GAMING DEVICE", filed on Sep. 10, 2004, U.S. patent application Ser. No. 10/938,187, entitled "GAMING INCENTIVE SYSTEM AND METHOD OF REDEEMING BONUS POINTS", filed on Sep. 10, 2004, all of which are herein incorporated by reference.

In one aspect of the present invention, the system 10 may contribute to a progressive jackpot award when a user or player 24 accesses their account and uses bonus points. The contribution criteria are programmable and pre-determined. For example, the progressive jackpot award may be specified to specific users or players 24 and/or limited to specific machines 12. The contribution criteria may also be used to set up a promotion which runs for a specific time period.

Typically, the jackpot award has an associated payout value, which may be in terms of cash or credits. In one aspect, the payout value has a minimum value and a maximum value. When the progressive jackpot award is initialized or reset, the payout value is set to the minimum value.

In another aspect of the invention, the use or play, i.e., wager, by the player or user 24 may trigger the progressive jackpot award to be awarded to the player or user 24.

In one embodiment, a triggering event for the progressive jackpot award may be defined in terms of a result on the gaming machine 12. For example, if the gaming machine 12 is a video slot machine, the triggering event may be defined as the appearance of a specific pattern of gaming symbols.

In another embodiment, the triggering award may be defined by a triggering amount. The triggering amount is a randomly determined number between the minimum and maximum values of the payout value. In one aspect, a minimum triggering value may be established, which as above the minimum value. The randomly determined number is between the minimum triggering value and the maximum value. If the payout value equals or exceeds the triggering value, then the progressive jackpot award is triggered.

Figure 3:
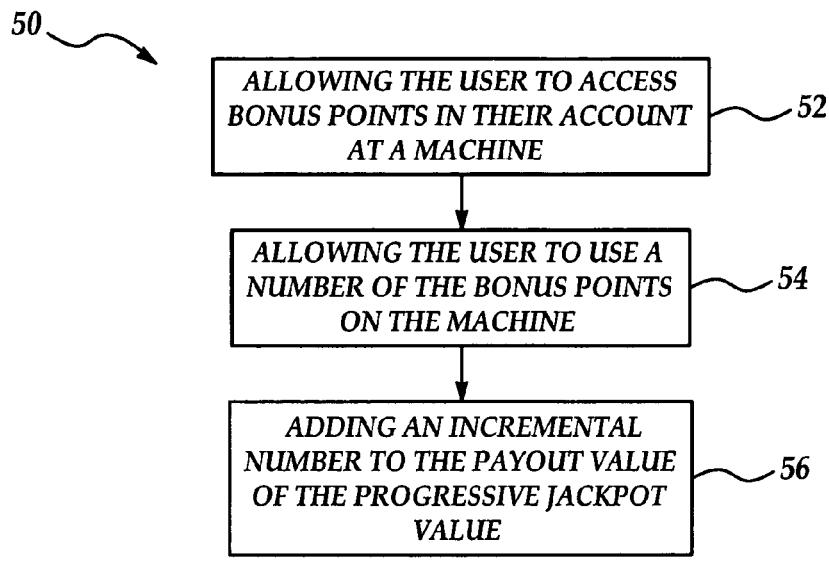
FIG. 3 is a flow diagram of a method for crediting a player of a gaming machine, according to a first embodiment of the present invention.

With specific reference to FIG. 3, in one aspect of the present invention, a method 50 for establishing a progressive jackpot award associated with a machine 12 useable by a user 24 is provided. As discussed above, the user 24 has a user account stored in database 22 stored on the computer or host computer 18. The user account stores user account data including bonus points associated with the user 24. The user 24 may access and use the incentive awards or bonus points in their user account on one of the machines 12. If the machine 12 the user 24 has chosen is a gaming machine, the bonus points may be converted to credits and wagered. If the machine 12 is a kiosk, 25 or point of redemption 25, or point of sale terminal, then the user 24 may be allowed to use the bonus points in exchange of gifts or services. Alternatively, the bonus points may be embodied in a paper or electronic voucher for a specific gift or service. While the voucher may only be exchanged for the specified gift or service, the voucher may also have an assigned value in terms of credits or cash which may be used in determining whether the progressive jackpot award has been triggered.

In a first step 52, the user 24 accesses the bonus points in the user account at the machine 12. In a second step 54, the user or player 24 uses a number of the bonus points, by converting the bonus points into credits and wagering the credits or by exchanging the bonus points for gift(s) and/or service(s) or by exchanging the voucher for the specified gift or service. In a third step 56, an incremental number is added to the payout value as a function of the number of bonus points used by the user 24.

As stated above, the payout value may be defined in terms of a number of credits or cash, i.e., a dollar amount. Alternatively, the payout value may be in credits. In one embodiment, the incremental number is determined as a function of the number of bonus points used by the user 24 and a predetermined ratio.

As discussed, above, the progressive jackpot award is contributed to by a predetermined number or subset of the machines 12.

In one embodiment, the machine 12 is a gaming machine, such as a video gaming machine.

As discussed above, if the machines 12 is a gaming machine, the bonus points may be convertible to credits, either cashable or non-cashable. Once the user 24 has accessed the bonus points and converted the bonus points to credits, the credits may be wagered on the gaming machine 12.

Figure 4:
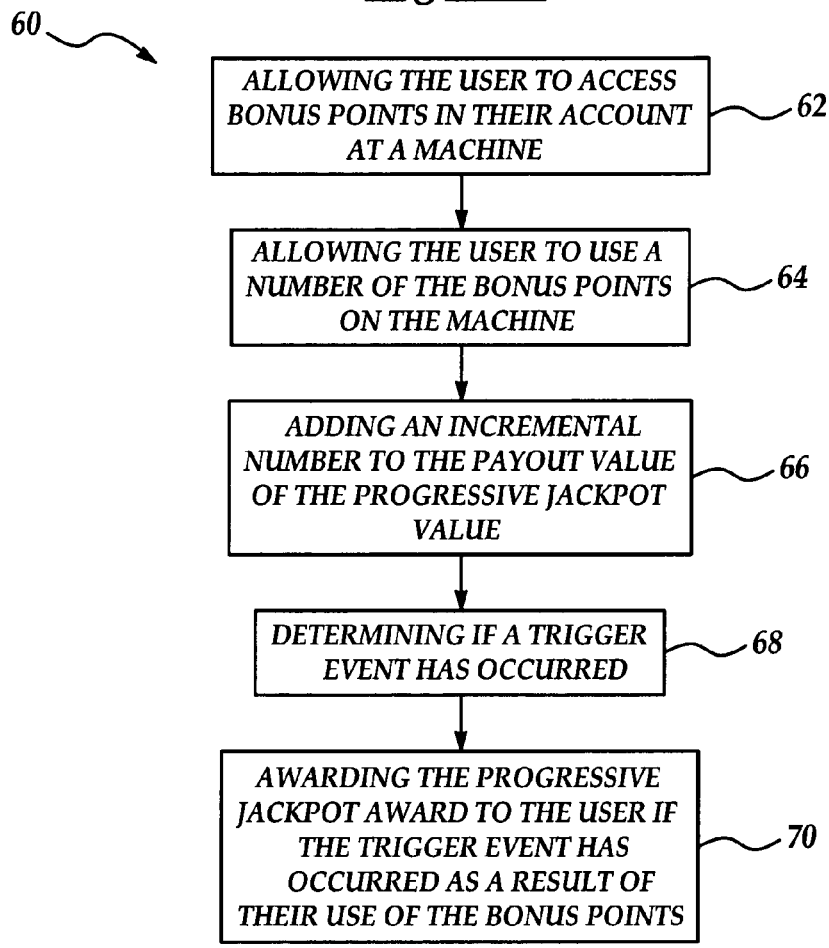
FIG. 4 is a flow diagram of a method for crediting a player of a gaming machine, according to a second embodiment of the present invention; and, FIG. 5 is a flow diagram of a method for crediting a player of a gaming machine, according to a third embodiment of the present invention.

With reference to FIG. 4, in another aspect of the present invention, a method 60 for providing a progressive jackpot award to the user 24 of one of the machines 12 will now be discussed. The machines 12 are networked to the computer or host computer 18. The computer 18 has a database for storing a user account thereon. The user account has a number of bonus points associated with the user 24. The progressive jackpot award has an associated payout value.

In a first step 62, the user 24 accesses the bonus points in the user account at the machine 12. In a second step 64, the user or player 24 uses a number of the bonus points, by converting the bonus points into credits and wagering the credits or by exchanging the bonus points for gift(s) and/or service(s) or by exchanging the voucher for the specified gift or service. In a third step 66, an incremental number is added to the payout value as a function of the number of bonus points used by the user 24. In a fourth step 68, if a trigger event has occurred, then the progressive jackpot award is awarded to the user 24 if the user's use of their bonus points results in the trigger event (fifth step 70).

As a plurality of machines 12 may be contributing to the progressive jackpot award, another user 24 may access and use the bonus points in their user account from another of the plurality of machines. Another incremental amount may be added to the payout value as a result of the another player's use. If the another player's use results in the trigger event, then the progressive jackpot award is awarded to the another player.

The progressive jackpot award may be awarded in any way. For example, the progressive jackpot award may be awarded by the machine 12, credited by the computer 18 to the player's account, awarded by an employee of the casino at the machine 12, or the user 24 may be required to go to a designated location for the award to take place.

The trigger event may be defined by a randomly determined number or trigger amount. In one embodiment, the trigger event is determined to have occurred when the progressive jackpot award reaches the trigger amount when the incremental number is added to the progressive jackpot award. In another embodiment, the trigger event is determined to have occurred when the incremental number (added to the payout value as a function of the number of bonus points used by the user 24) is equal to the trigger amount or within a predetermined tolerance.

The progressive jackpot award may be a one-time award or may be a recurring award. If the progressive jackpot award is recurring, then after it has been awarded, the award value may be reset to the minimum value.

In one embodiment, the methods discussed above may be implemented by the computer program application 20 and the player tracking device 38.

Figure 5:
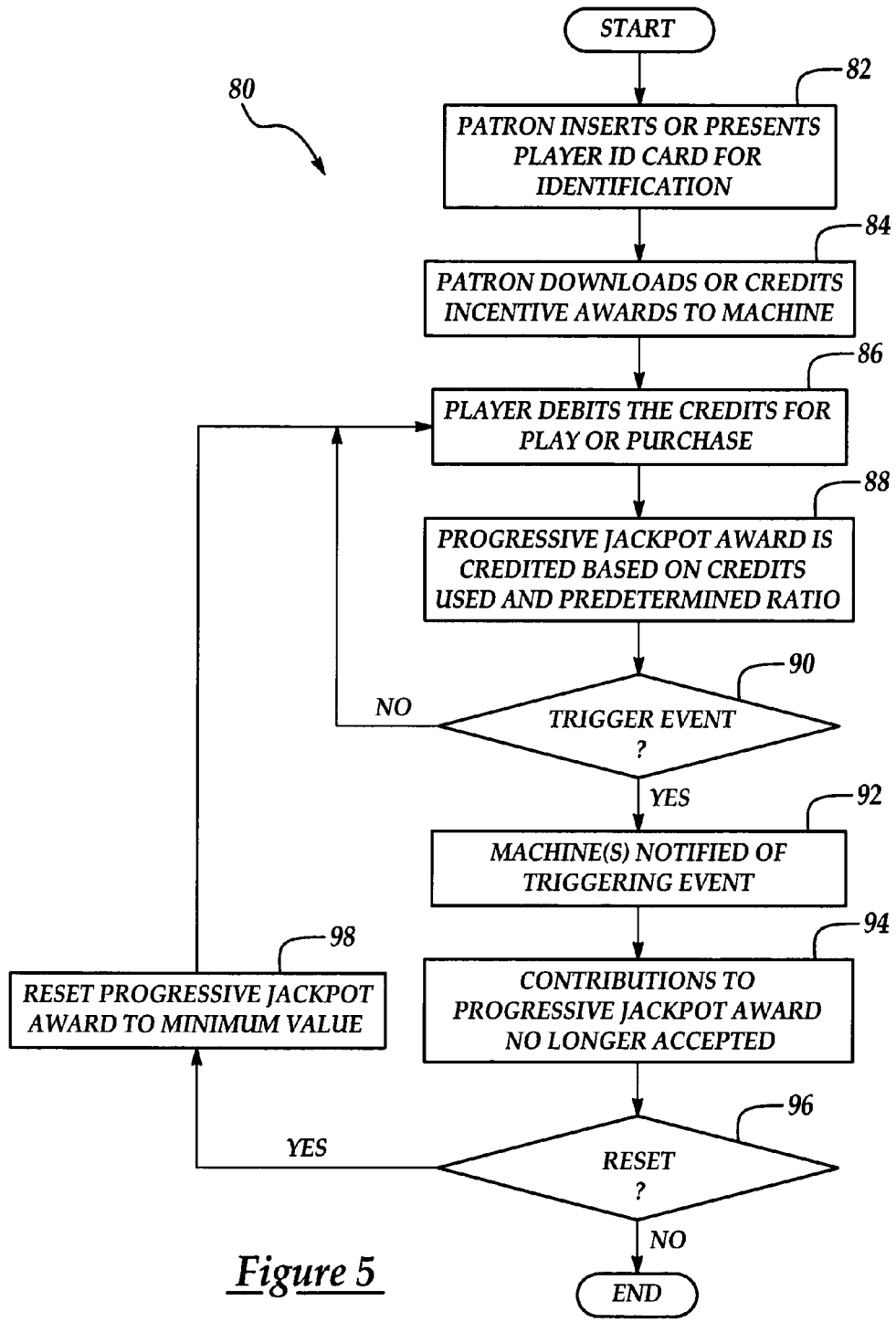

With reference to FIG. 5, a method 80 for establishing and awarding a progressive jackpot award according to a further embodiment of the present invention will now be discussed.

In a first step 82, the user or patron 24 inserts their player tracking ID card for identification. In some instances, the user 24 may hand their ID card to an employee of the casino or other establishment. The employee may swipe or read the ID card or enter a player ID number into the machine 12. Alternatively, the user 24 may swipe their ID card through the ID card reader 42 on the machine 12. The user 24 may be presented with a list of vouchers or list of available incentive awards which are associated with their account and available for use or download. In a second step 84, the user 24 downloads some or all of the available incentive awards to the player tracking device 38. If required, bonus points may be converted to credits (cashable or non-cashable). In a third step 86, the user 24 debits the credits in the player tracking device 38 through wagering and/or purchasing items and/or exchanging the credits or bonus points for gift(s) and/or service(s). In a fourth step 88, when the user 24 debits the credits, a corresponding number is added to the progressive jackpot award based on the numbers of bonus points or credits used.

In a first decision block 90, if the trigger event has occurred then the method 80 proceeds to fifth step 92. Otherwise, the progressive jackpot award is not award to any user 24 and contributions are continued to be made thereto. The method 80 returns to the third step 86.

In the fifth step 92, the machines 12 are notified of the triggering event and in a sixth step 94, contributions to the progressive jackpot award are halted.

In a second decision block 96, if the progressive jackpot award is recurring, then the method 80 proceeds to a seventh step 98. Otherwise, the method 80 ends. In the seventh step, the payout amount is reset to the minimum value and the method 80 returned to the third step 86.

Obviously, many modifications and variations of the present invention are possible in light of the above teachings. The invention may be practiced otherwise than as specifically described within the scope of the appended claims

What is claimed is:

1. A method for establishing a progressive jackpot award associated with a plurality of machines usable by a plurality of users, each user having a user account stored in a computer connected to the machine, the computer including a database for storing user account data including bonus points associated with each user, the progressive jackpot award having an associated payout value, including the steps of:

allowing the users to use the machines and responsively award the users with bonus points as a function of their use of the machines and a predetermined criteria;

storing the bonus awarded to each player in the associated user account;

allowing the users to access the bonus points in the associated user account from the machines;

allowing the users to use a number of the bonus points on the machines by exchanging the bonus points for at least one from a group including a non-gaming gift and a non-gaming service;

adding an incremental number to a progressive jackpot award pool as a function of the number of bonus points used by each user; and, detecting a trigger condition during use of one the gaming machines by a progressive winning one of the users and responsively awarding to the progressive winning one of the users at least a portion of the promotional progressive jackpot pool as the jackpot award.

2. A method, as set forth in claim 1, wherein the payout value is in credits.

3. A method, as set forth in claim 1, wherein the payout value is in cash.

4. A method, as set forth in claim 1, wherein the incremental number is determined as a function of the number of bonus points used by the user and a predetermined ratio.

5. A method, as set forth in claim 1, wherein a trigger amount is a randomly determined number.

6. A method, as set forth in claim 5, wherein the trigger event is defined as the progressive jackpot award reaching the trigger amount when the incremental number is added to the progressive jackpot award.

7. A method, as set forth in claim 5, wherein the trigger event by the incremental number being equal or substantially equal to the trigger amount.

8. A method, as set forth in claim 1, including the step of resetting the progressive jackpot award to an initial value after the progressive jackpot award is paid out.

9. A method, as set forth in claim 1, wherein the bonus points are incentive points.

10. A method, as set forth in claim 1, wherein the bonus points are convertible to credits.

11. A method, as set forth in claim 1, wherein the bonus points are convertible to credits, the method including the step of downloading the bonus points as credits to the machine.

12. A method, as set forth in claim 1, wherein the machine is a gaming device.

13. A method, as set forth in claim 12, wherein the gaming device is a video gaming machine.

14. A method, as set forth in claim 12, wherein bonus points are convertible to credits, and the step of allowing the user to use a number of the bonus points includes the steps of:

converting the number of bonus points to credits; and allowing the user to wager the credits on the gaming device.

15. A method, as set forth in claim 1, wherein the bonus points may be converted to credits.

16. A method, as set forth in claim 15, wherein the credits are designated as cashable or non-cashable.

17. A system for establishing a progressive jackpot award, the progressive jackpot award having an associated payout value, comprising:
   a plurality of machines usable by a plurality of users;
   a computer coupled to the machine for tracking a user account for each user; and,
   a database, on the computer, for storing user account data in the corresponding user account, including bonus points associated with the user, the computer for allowing the users to access the bonus points in their user account from the machines and to use a number of bonus points on the machine by exchanging the bonus points for at least one from a group including a non-gaming gift and a non-gaming service, for adding an incremental number to a progressive jackpot award pool as a function of the number of bonus points used by the user and for detecting a trigger condition during use of one of the gaming machines by a progressive winning one of the users and responsively awarding to the progressive winning one of the users at least a portion of the promotional progressive jackpot pool as the jackpot award.

18. A system, as set forth in claim 17, wherein the payout value is in credits.

19. A system, as set forth in claim 17, wherein the payout value is in cash.

20. A system, as set forth in claim 17, wherein the incremental number is determined as a function of the number of bonus points used by the user and a predetermined ratio.

21. A system, as set forth in claim 17, wherein a trigger amount is a randomly determined number and the trigger event is defined as the progressive jackpot award reaching the trigger amount when the incremental number is added to the progressive jackpot award.

22. A system, as set forth in claim 17, wherein a trigger amount is a randomly determined number and the trigger event is defined as the incremental amount being equal or substantially equal to the trigger amount.

23. A system, as set forth in claim 17, the computer for resetting the progressive jackpot award to an initial value after the progressive jackpot award is paid out.

24. A system, as set forth in claim 17, wherein the bonus points are incentive points.

25. A system, as set forth in claim 17, wherein the bonus points are convertible to credits.

26. A system, as set forth in claim 17, wherein the bonus points are credits, the computer for downloading the bonus points as credits to the machine.

27. A system, as set forth in claim 17, wherein the machine is a gaming device.

28. A method, as set forth in claim 27, wherein the gaming device is a video gaming machine.

29. A system, as set forth in claim 17, wherein the bonus points are convertible to credits, the computer for converting the number of bonus points to credits, allowing the user to wager the credits on the gaming device.

30. A system, as set forth in claim 17, wherein the bonus points may be converted to cashable credits.

31. A system, as set forth in claim 17, wherein the bonus points may be converted to non-cashable credits.

\* \* \* \* \*